US011910958B2

United States Patent
Fries

(10) Patent No.: US 11,910,958 B2
(45) Date of Patent: Feb. 27, 2024

(54) UPPER PART FOR A SPICE MILL

(71) Applicant: JOMA KUNSTSTOFFTECHNIK GMBH, Brunn am Gebirge (AT)

(72) Inventor: Rudolf Fries, Kaumberg (AT)

(73) Assignee: JOMA KUNSTSTOFFTECHNIK GMBH, Brunn am Gebirge (AT)

( * ) Notice: Subject to any disclaimer, the term of this patent is extended or adjusted under 35 U.S.C. 154(b) by 42 days.

(21) Appl. No.: 17/760,909

(22) PCT Filed: Oct. 16, 2020

(86) PCT No.: PCT/AT2020/060375
§ 371 (c)(1),
(2) Date: Mar. 16, 2022

(87) PCT Pub. No.: WO2021/072472
PCT Pub. Date: Apr. 22, 2021

(65) Prior Publication Data
US 2022/0346601 A1     Nov. 3, 2022

(30) Foreign Application Priority Data
Oct. 18, 2019   (AT) .............. A 50900/2019

(51) Int. Cl.
*A47J 42/38*     (2006.01)
*A47J 42/04*     (2006.01)
(Continued)

(52) U.S. Cl.
CPC ............... *A47J 42/38* (2013.01); *A47J 42/04* (2013.01)

(58) Field of Classification Search
CPC . A47J 42/38; A47J 42/04; A47J 42/02; B29C 45/00
See application file for complete search history.

(56) References Cited

U.S. PATENT DOCUMENTS

| | | | |
|---|---|---|---|
| 2010/0187343 A1* | 7/2010 | Stasin | A47J 42/04 264/537 |
| 2012/0091240 A1* | 4/2012 | Delbridge | A47J 42/04 241/169.1 |

(Continued)

FOREIGN PATENT DOCUMENTS

| | | | |
|---|---|---|---|
| DE | 202 17 145 U1 | 4/2003 | |
| DE | 102016106597 A1 * | 9/2016 | A47J 42/02 |

(Continued)

OTHER PUBLICATIONS

English translate (DE102016106597A1), retrieved date Jun. 19, 2023.*

(Continued)

*Primary Examiner* — Matthew Katcoff
*Assistant Examiner* — Mohammed S. Alawadi
(74) *Attorney, Agent, or Firm* — GREENBLUM & BERNSTEIN, P.L.C.

(57) ABSTRACT

An upper part for a spice mill at least partly of a plastic material includes an upper cover surface with at least one opening, in particular a through-opening for ground spices, a circumferential lateral surface, and a milling element or a mounting for the milling element. A preferably elastically deformable snap-action element, by which the upper part can be rotatably connected to a lower part, is arranged so as to be flush with the opening in plan view.

20 Claims, 6 Drawing Sheets

(51) Int. Cl.
*A47J 42/02* (2006.01)
*B29C 45/00* (2006.01)

(56) References Cited

U.S. PATENT DOCUMENTS

2014/0319255 A1   10/2014   Delbridge et al.
2022/0000313 A1   1/2022    Fries

FOREIGN PATENT DOCUMENTS

| EP | 2 454 979 A1 | 5/2012 |
| EP | 3 181 023 A1 | 6/2017 |
| GB | 2 217 231 A | 10/1989 |
| WO | 2020/124114 A1 | 6/2020 |

OTHER PUBLICATIONS

International Search Report issued in International Patent Application No. PCT/AT2020/060375, dated Jan. 25, 2021, along with an English translation thereof.
Written Opinion of the International Searching Authority issued in International Patent Application No. PCT/AT2020/060375, dated Jan. 25, 2021.
English language translation of International Preliminary Report on Patentability for International Patent Application No. PCT/AT2020/060375, dated Apr. 21, 2022.

* cited by examiner

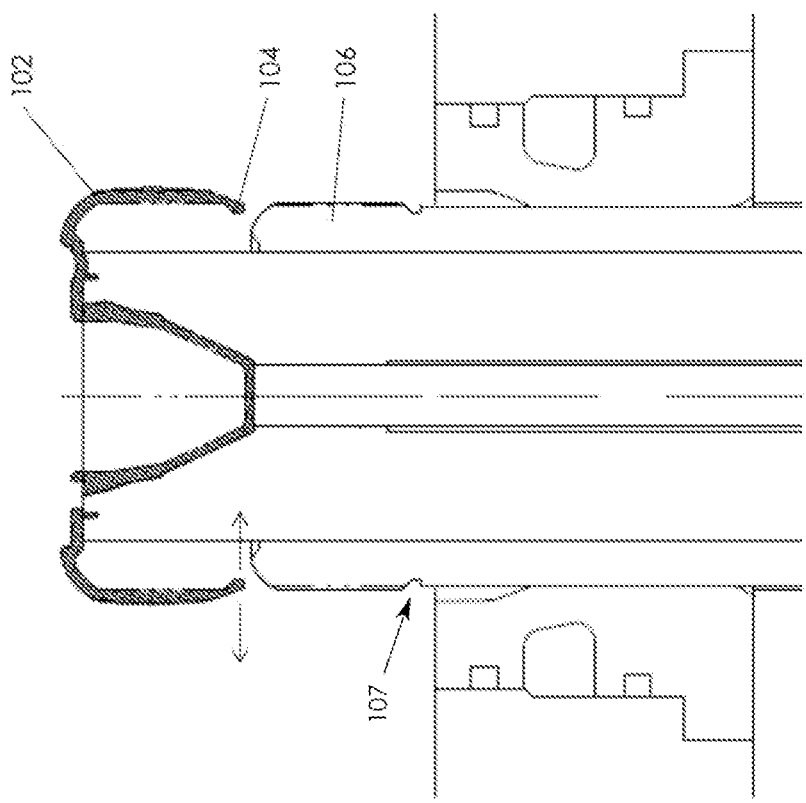
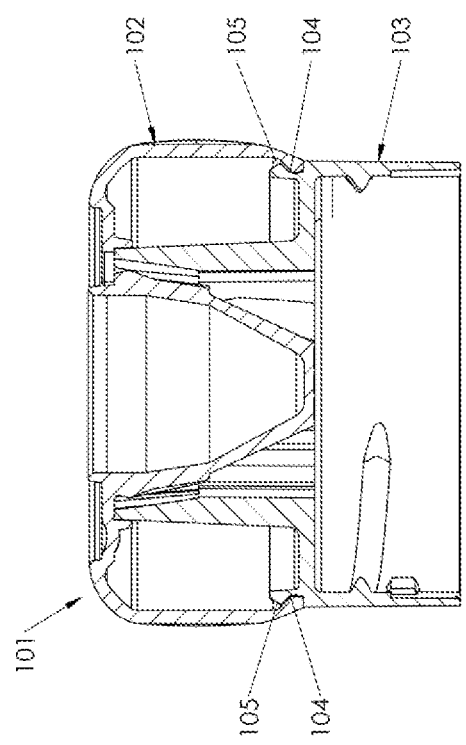

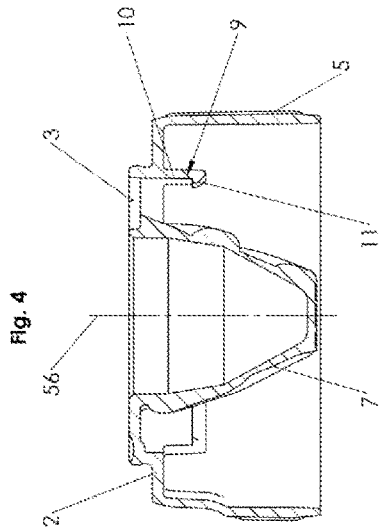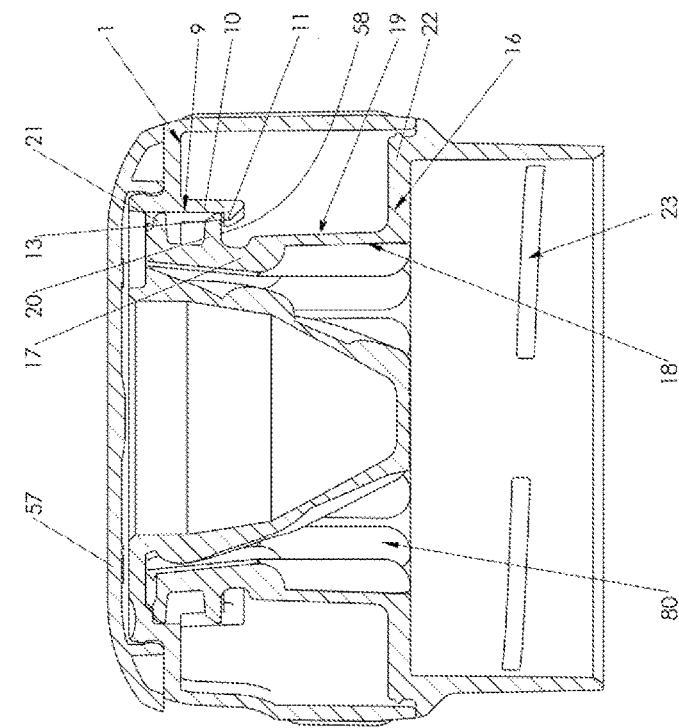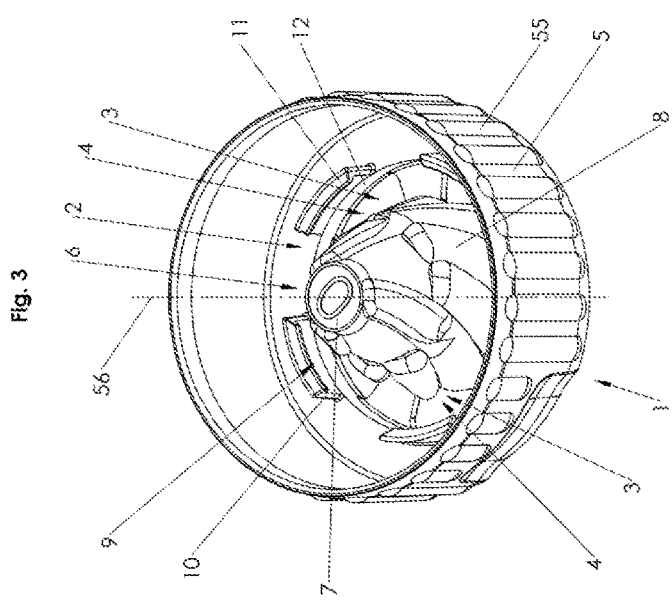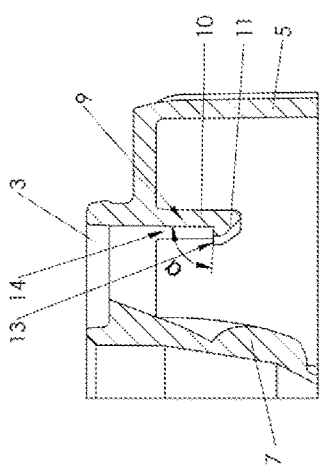

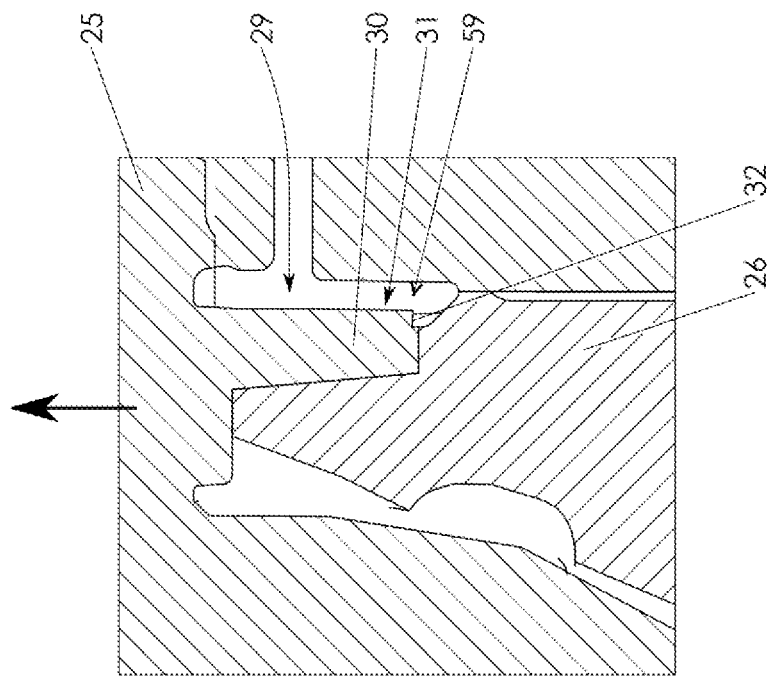
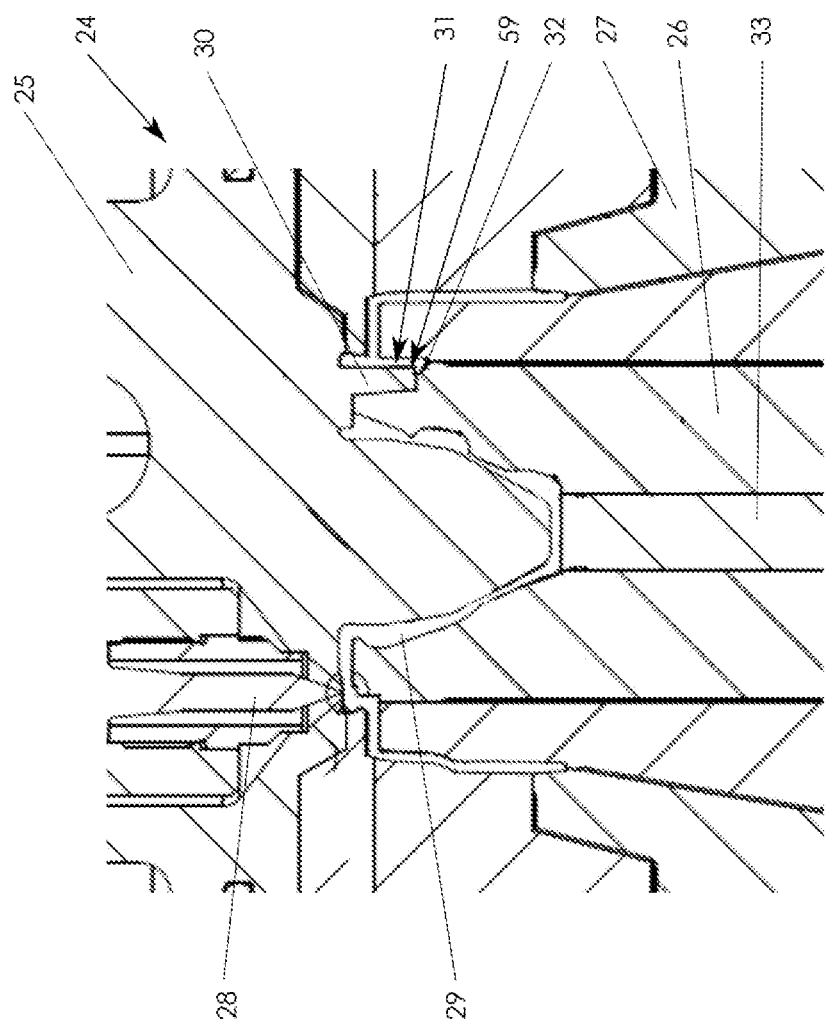

UPPER PART FOR A SPICE MILL

The invention relates to an upper part for a spice mill, which consists, at least partly, of a plastic material, and comprises the following:
- an upper cover surface with at least one opening, in particular a through-opening for ground spices,
- a circumferential lateral surface, and
- a milling element, or a mounting for the milling element.

The invention further relates to an injection moulding tool for the manufacture of the upper part, together with a method for the manufacture of the upper part using the injection moulding tool.

Generic spice mills usually have an upper part and a lower part, that is to say, a rotor and a stator, both of which are provided with milling elements for purposes of milling spices, wherein as a rule the upper part is mounted such that it can rotate relative to the lower part, which is fixedly connected to a container. By the rotation of the upper part with respect to the lower part, the milling elements are set in rotation relative to each other, and thereby mill the spice in a milling gap that is located between the milling elements.

In order to create a rotatable connection between the upper part and the lower part, a circumferential projection, facing inwards towards the axis of rotation, is usually provided on the lower edge of the circumferential lateral surface of the upper part, which projection engages in a corresponding groove on the lower part. This type of connection allows the upper part to rotate relative to the lower part, and essentially prevents an inadvertent detachment of the upper part from the lower part.

The upper part and the lower part are typically manufactured in a plastic injection moulding method. In this method, a curable plastic material is introduced into a cavity of an injection moulding tool, which determines the shape of the lower and upper parts to be created. In order to create the projection on the lateral surface of the upper part, the injection moulding tool usually has a circumferential indentation. After curing, the upper part must disadvantageously be removed from the injection moulding tool (that is to say, the indentation) by the application of force, whereby the upper part, in particular the lateral surface and the projection, is deformed for a short time (so-called forced demoulding). This can weaken the material, or even destroy the upper part. Relatively brittle plastic material can therefore either not be used at all, due to the necessary forced demoulding, or only with unacceptable reject rates.

In order to keep the production waste low, in the prior art the circumferential projection is sometimes kept small and designed without undercuts. However, an undercut, or at least a 90° angle of the contact surface of a snap element, relative to the surface from which the snap element projects, and/or an enlargement of the projection, would have the advantage of a better holding action on the lower part.

In the prior art spice mills and spice mills are of known art from GB 2 217 231 A, DE 202 17 145 U1, US 2014/0319255 A1, and EP 3 181 023 A1, for example.

In the light of these statements, it is therefore an object of the present invention to minimise, or completely eliminate, the disadvantages of the prior art. In particular, it is an object of the present invention to create an upper part that is easy to produce, and that can be withdrawn from an injection moulding tool during manufacture without deformation. In addition, it is an object of the present invention to provide a method and an injection moulding tool for the manufacture of such an upper part.

This object is achieved firstly by the features of claim 1.

In accordance with the invention, a preferably elastically deformable snap element is provided that is aligned flush with the opening in plan view, with which snap element the upper part can be rotatably connected to a lower part. By the arrangement of the snap element at the opening, an injection moulding tool with a moulding element can be used to form the snap element, and this moulding element can be removed through the opening before the upper part is removed from the injection moulding tool. As a consequence, the upper part can be removed from the injection moulding tool essentially without any forced demoulding. In comparison, in the prior art, as described in the introduction, the circumferential inwardly facing projection or the circumferential lateral surface is deformed as it is removed from the injection moulding tool. This can lead to damage to the upper part, as described above. With the inventive upper part, this is avoided, and it is also possible to design snap elements with undercuts. Thus, with the inventive upper part, not only can the production waste be minimised, but the holding action of the upper part on the lower part can also be improved. In addition, even relatively brittle plastic materials can advantageously be processed. In particular, a through-opening for milled spices can function as the opening. It is therefore not necessary to use openings on the cover surface that are provided specifically for the manufacturing process. The circumferential lateral surface can be connected to an outer edge of the cover surface and can be designed to be essentially cylindrical in shape, if required with an outer and/or inner curvature. The cover surface can also be curved or stepped, if required. The upper part can form the milling element, for example a milling cone with milling projections, on an inner face of the cover surface, or can have a mounting for the milling element on the inner face. A mounting for the milling element has the advantage that the milling element can be replaced, and that milling elements made of a material other than that of the upper part can also be used. The upper part can, for example, be made of a plastic material, and the milling element can be made of a ceramic material. In particular, the upper part can also be made of a biodegradable plastic material that is comparatively brittle. In particular, the upper part can be made of polylactide (PLA). The snap element preferably protrudes from the cover surface, in particular in the direction of the milling element, or in the direction of the mounting for the milling element.

For the purposes of this disclosure, directional indications such as "above", "below", "inside" and "outside" refer to a quiescent position in which the upper part, that is to say, the spice mill, is usually connected to a container, and the container is placed on the bottom surface opposite the receiving opening. In this intended quiescent state, the cover surface is "above" and the milling element, or the mounting for the milling element, is "inside". "Inwards" means facing towards the axis of rotation of the upper part. "Outwards" means facing away from the axis of rotation of the upper part.

To increase the holding action, at least two, preferably at least three, openings can be provided, which are arranged along an imaginary circle. The openings are preferably arranged symmetrically around the axis of rotation of the upper part, running through the milling element or the mounting.

In one form of embodiment, provision can be made for a snap element to be arranged in alignment with each opening, wherein the snap elements are spaced apart from each other. The number of snap elements is limited to the number of openings, as in each case the corresponding moulding element is removed through the opening in the cover surface, in order to avoid any forced deformation. The number of snap elements will advantageously correspond to the number of openings. By virtue of the presence of a plurality of snap elements, advantageously arranged in what is preferably an even distribution over the periphery, and their spacing from one another, an even holding action is also achieved.

Furthermore, the opening and the snap element can have the shape of a circular arc in plan view. The inner and outer radius of the circular arc-shape opening(s) are preferably concentric with the outer circumference of the cover surface or the lateral surface, respectively. The radius of curvature of the circular arc-shape is preferably matched to the radius of curvature of a circumferential snap projection of the lower part. The circular arc shape can improve the holding action of the upper part on the lower part, and the ability of the upper part to rotate relative to the lower part.

It is preferable if the snap element has a preferably elastically deformable web with a snap lug, which web is projecting from the opening in the direction of the milling element. The web preferably protrudes from the cover surface, in particular in the direction of the milling element, or in the direction of the mounting for the milling element. It is preferable if the snap lug faces towards an axis of rotation, or an axis of symmetry of the upper part. Alternatively, provision can be made for the snap lug to face away from an axis of rotation, or an axis of symmetry of the upper part. The web can be arranged essentially at right angles to the cover surface. The web can be located on an outer edge of the opening, facing away from the axis of rotation, or the axis of symmetry, or on an inner edge of the opening facing towards the axis of rotation, or the axis of symmetry. In order to keep the deflection of the web as small as possible when connecting the snap elements, it is advantageous if the snap lug is arranged at an end of the web facing away from the cover surface.

In order to improve the holding action further, and essentially to prevent any inadvertent detachment of the upper part from the lower part, provision can be made for an upper snap surface of the snap lug to enclose an angle α of 90° or less, preferably of between 75° and 90°, with an inner surface of the web. Here the upper snap surface of the snap lug is a surface facing towards the cover surface. The inner surface of the web faces towards the snap lug, and preferably faces towards the axis of rotation of the upper part. In other words, the snap lug subtends an acute angle with the web, thereby forming an undercut.

In a development of the invention, a spice mill is provided, which has the following:
  a upper part in accordance with the above statements;
  a lower part with a preferably circumferential snap projection, wherein the lower part is connected to the upper part such that it can rotate by way of a snap connection between the snap element and the snap projection.

In this development, the upper part is rotatably connected to the lower part. The snap element is snapped onto the snap projection, such that the upper part is prevented from detaching from the lower part, but the two parts can be rotated relative to each other. The snap projection is preferably designed to be circumferential, that is to say, closed on itself. The snap projection has, in particular on a lower face, a preferably curvature-free sliding surface, which allows the snap element to slide in the circumferential direction of the spice mill. If necessary, the snap connection can be released by bending the snap element. The upper part preferably has a plurality of snap elements of the same type, which, in the assembled state of the spice mill, are snapped onto the snap projection as described.

Provision can be made for the lower part to have a lateral surface, in particular one that is cylindrical or conical, on the inner surface of which milling projections are provided, and on the outer surface of which the snap projection is provided. In particular, provision can be made for the snap projection to be located on, or adjacent to, an upper end, or in the upper half of the outer surface of the lateral surface.

In a preferred form of embodiment, provision is made for the lower part to have a seating projection, which seating projection is adjacent to a lower free end of the lateral surface. The seating projection provides a kind of rotational guide for the upper part and prevents the circumferential lateral surface of the upper part from being pressed inwards.

The invention is also achieved by a method for the manufacture of an upper part in accordance with the above statements. The method has the following steps:
  Provision of a multi-part injection moulding tool with a first tool part and a second tool part, wherein a cavity is formed between the first tool part and the second tool part, which cavity essentially corresponds to the upper part, wherein for forming the snap element a moulding element of the first tool part is inserted into a recess of the second tool part, and the snap element is formed between tool surfaces of the moulding element of the first tool part and the recess of the second tool part;
  Introduction of a curable plastic material by way of a nozzle into the cavity;
  Separation of the first and second tool parts, wherein the moulding element is removed from the recess through the opening of the upper part;
  Ejection of the upper part.

With regard to the advantages of the upper part, reference is made to the above statements. With the inventive method it is possible, as described, to create the upper part, and, before the ejection of the upper part, that is to say, the removal of the upper part from the injection moulding tool, to remove the moulding element of the injection moulding tool, which is used to mould the snap element, through the opening of the upper part. This avoids the forced demoulding referred to in the introduction. The injection moulding tool comprises at least a first tool part and a second tool part. Further tool parts can, however, also be provided.

In the assembled state of the injection moulding tool, a cavity is formed between the tool parts, as is common practice in the prior art. This cavity, that is to say, its boundary surface, determines the shape of the upper part to be created. The space between the tool surfaces of the moulding element and the recess, in which the snap element is formed, forms a sub-region of the cavity. Provision can be made for the nozzle that introduces the plastic material into the cavity to be arranged on the first or second tool part. In accordance with the invention, provision is made for the snap element to be formed between the tool surfaces of the moulding element of the first tool part and the recess of the second tool part. For this purpose, the moulding element is inserted into the recess during casting and curing. The opening of the upper part is thereby formed around the moulding element. After curing of the plastic material, and before ejection of the upper part, the first and second tool parts are separated from each other. The moulding element is thereby pulled out of the recess, and in fact through the opening in the upper part that has been created. If a plurality of openings are provided, the injection moulding tool can have a corresponding number of recesses and moulding elements. In the simplest case, the moulding element can be cuboid in shape. If a snap element is to be produced that has the shape of a circular arc in plan view, the moulding element can have a curvature. The recess can also have a corresponding curvature.

It is advantageous if the moulding element of the first tool part, and/or the recess of the second tool part, has an indentation for purposes of forming the snap lug. In particular, the indentation can be provided on a lower face of the moulding element, which faces away from the rest of the first tool part.

An advantageous development of the method, which enables the manufacture of a mill, comprises the following steps:

Manufacture of an upper part in accordance with the method described above;
Manufacture of a lower part with a preferably circumferential snap projection;
Connection of the upper part and the lower part by way of a snap connection between the snap element and the snap projection.

The bottom part can also be manufactured by an injection moulding process.

The above object is also achieved by an injection moulding tool for the manufacture of an upper part in accordance with the above statements. The injection moulding tool consists of at least a first and a second tool part, wherein, in a production position of the injection mould, a cavity is formed between the first and the second tool parts, which cavity essentially corresponds to the upper part, wherein for the formation of the snap element a moulding element of the first tool part is introduced into a recess of the second tool part, and a sub-region of the cavity, in which the snap element is formed, is bounded by tool surfaces of the moulding element of the first tool part and the recess of the second tool part.

With regard to the advantages of the upper part, that is to say, the use of the injection moulding tool, reference is made to the above statements on the upper part and the method of manufacture. The first tool part can be detached from the second tool part. In the production position, these are joined together to form the cavity for the upper part. A nozzle can be attached to the first and/or second tool part for purposes of introducing a curable plastic material into the cavity.

It is preferable if the moulding element of the first tool part, and/or the recess of the second tool part, has an indentation for purposes of forming the snap lug. In particular, the indentation can be provided on a lower face, which faces away from the rest of the first tool part.

In what follows the invention is explained in more detail with the aid of figures.

FIG. 1 shows a cross-section of a spice mill from the prior art;

FIG. 2 shows a step in the manufacture of the prior art upper part, and is intended to illustrate the problem of forced demoulding;

FIG. 3 shows an upper part in accordance with the invention, in an oblique view from below;

FIG. 4 shows a cross-section of an upper part in accordance with the invention;

FIG. 5 shows an enlarged view of a snap element;

FIG. 6 shows an assembled spice mill;

FIG. 8, FIG. 8a, FIG. 9 and FIG. 10 show a method of manufacture of an upper part in accordance with the invention.

Figure 7:
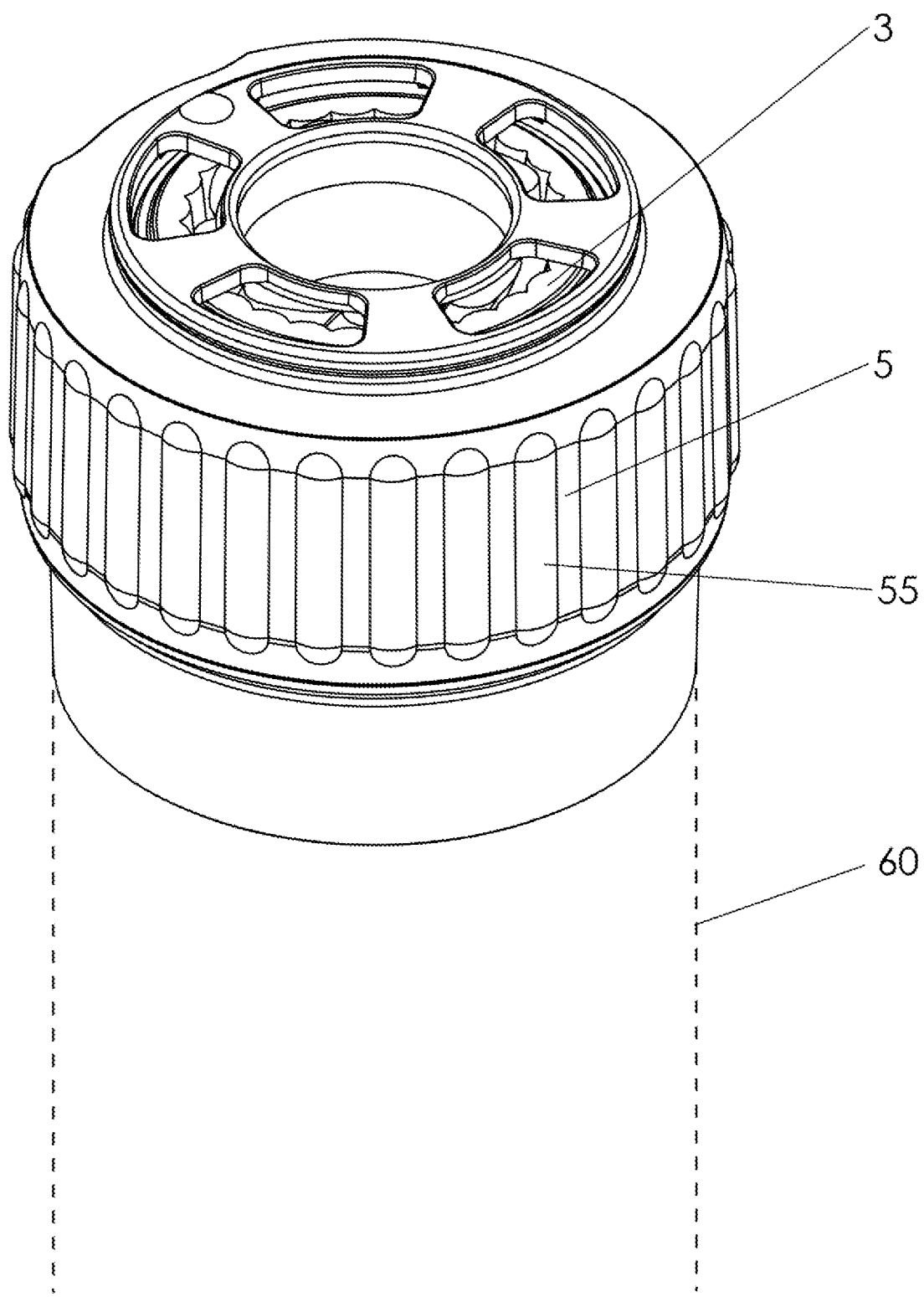
FIG. 7 shows an assembled spice mill in an oblique view from above.

FIG. 1 shows a spice mill 101 from the prior art, with an upper part 102 and a lower part 103. The upper part 102 has a circumferential, inwardly facing projection 104, which, when the spice mill 101 is in the assembled state, engages in a circumferential, outwardly facing groove 105 of the lower part 103.

In FIG. 2, the arrows illustrate that the upper part 102 is forcibly deformed as it is withdrawn from an injection moulding tool 106, because the projection 104 must be withdrawn over that part 107 of the injection moulding tool 106, which forms the projection 104 in the course of manufacture. This can lead to deformation of and damage to the upper part 102, for example fracture of the circumferential projection 104. Undercuts of the protrusion 104 can therefore not be formed in the designs of prior art.

FIG. 3 shows a preferred form of embodiment of an upper part 1 in accordance with the invention, in a view from below. The upper part 1 has a cover surface 2 with a plurality of openings 3, which in plan view are curved in the shape of a circular arc and are arranged symmetrically about an axis of rotation 56. As can be seen in FIG. 4, the cover surface can also be stepped. The openings 3 are preferably formed by through-openings 4 for ground spices. Furthermore, the upper part 1 has a circumferential lateral surface 5, which adjoins a circumferential edge of the cover surface 2. The lateral surface 5 of the upper part 1 can have raised grip elements 55 on its outer face. On an inner face 6 of the cover surface 2, the upper part 1 has a sectionally truncated milling cone as a milling element 7. Alternatively, a mounting for a milling element 7 can also be provided. This is particularly advantageous if the milling element 7 is made of a material that differs from that of the upper part 1. The openings 3 on the cover surface 2 are formed around the milling element 7. The milling element 7 has grinding projections 8 on an outer surface for purposes of milling the spice.

In plan view, the upper part 1 has snap elements 9 that in each case are aligned with the openings 3. However, a snap element 9 does not have to be arranged at each opening 3. The snap elements 9 in each case have a web 10 and a snap lug 11, which preferably faces inwards towards the axis of rotation 56. The webs 10 of the snap elements 9 are arranged essentially at right angles to the cover surface 2, and in each case are preferably located on the outer edge 12 of an opening 3 (facing away from the axis of rotation 56).

As can be seen, in particular, in FIG. 5, an upper snap surface 13 of the snap lug 11 subtends an angle α of 90° or less, preferably of between 75° and 90°, with an inner surface 14 of the web 10. In other words, the snap lug 11 subtends an acute angle with the web 10 so as to fa mi an undercut.

FIG. 6 shows an assembled spice mill 15 with an optional spice mill cap 57. The spice mill 15 has an upper part 1 and a lower part 16. The lower part 16 has, in particular, an essentially cylindrical, or conical, lateral surface 17, on the inner surface 18 of which milling projections 80 are arranged, which interact with the milling projections 8 of the milling cone 7, and grind the spice, as the upper part 1 is rotated relative to the lower part 16. A circumferential snap projection 20 is provided on the outer surface 19 of the lateral surface 17, which is, in particular, cylindrical or conical. In the assembled state of the spice mill 15 as shown, the lower part 16 is rotatably connected to the upper part 1 by way of a snap connection between the snap elements 9 and the snap projection 20. The snap connection prevents an inadvertent detachment of the upper part 1 from the lower part 16, but allows rotation of the upper part 1 relative to the lower part 16. In FIG. 6, it can be seen that the upper snap surface 13 of the snap lug 11 sits against a sliding surface 58 on the lower face of the snap projection 20. Needless to say, a clearance can also be present between the snap projection 20 and the upper snap surface 13 of the snap lug 11. To support and guide the upper part 1, the lower part 16 has a further projection 21 on the upper edge of the outer surface 19.

Adjacent to a free lower end of the lateral surface 17, the lower part 16 also has a seating projection 22, in particular a circumferential seating projection. The seating projection 22 protrudes further from the lateral surface 17 than the snap projection 20. The seating projection 22 prevents the circumferential lateral surface 5 of the upper part 1 from being pressed inwards unintentionally. Furthermore, the lower part 16 also has a threaded section 23, which, in the form of embodiment shown, adjoins the seating projection 22. The threaded section 23 can be used to connect the lower part 16 to a spice container (not shown).

FIG. 7 shows the spice mill 15 in an oblique view from above. A spice container 60, which is connected to the spice mill 15, is indicated here by dashed lines.

Figure 9:
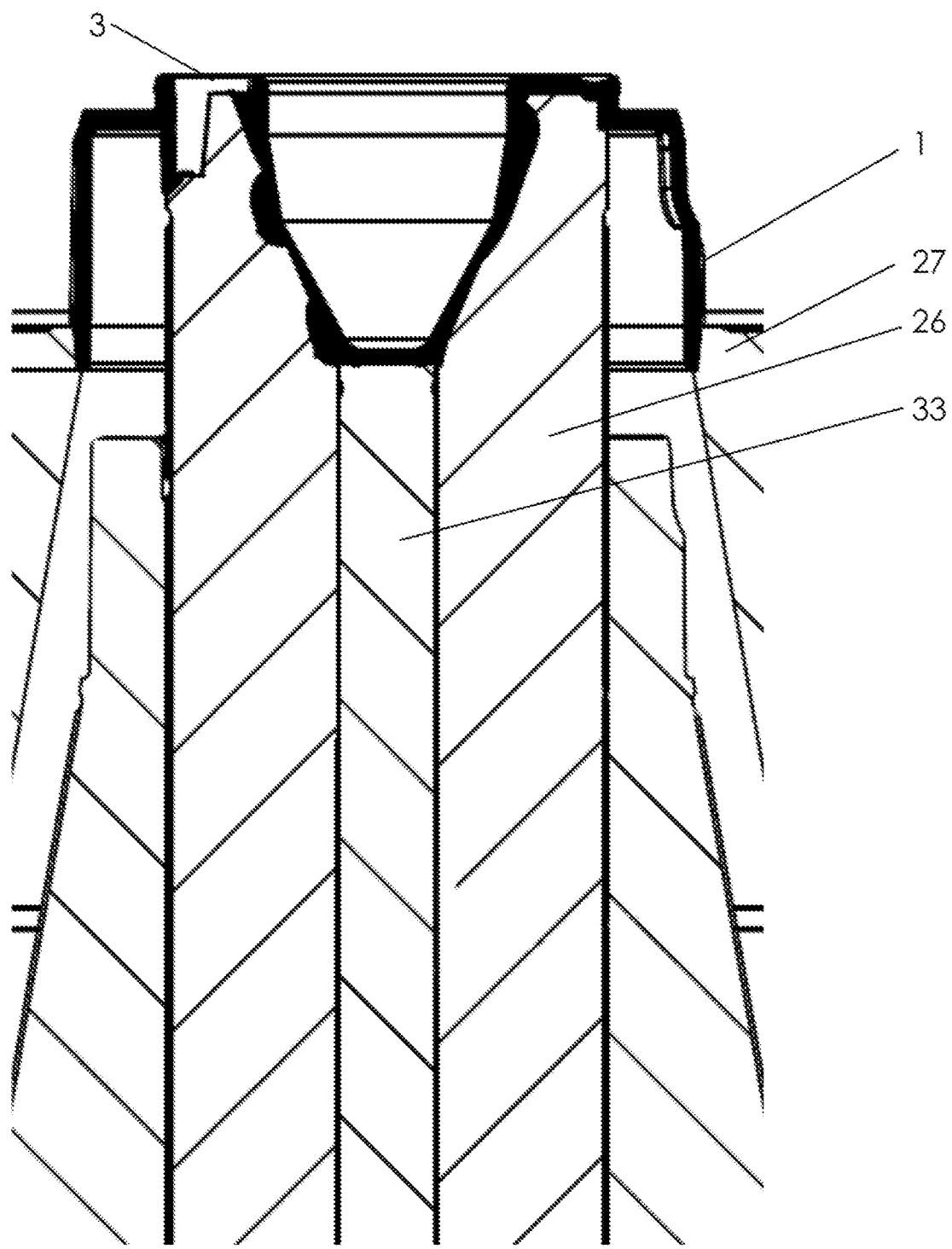
Figure 10:
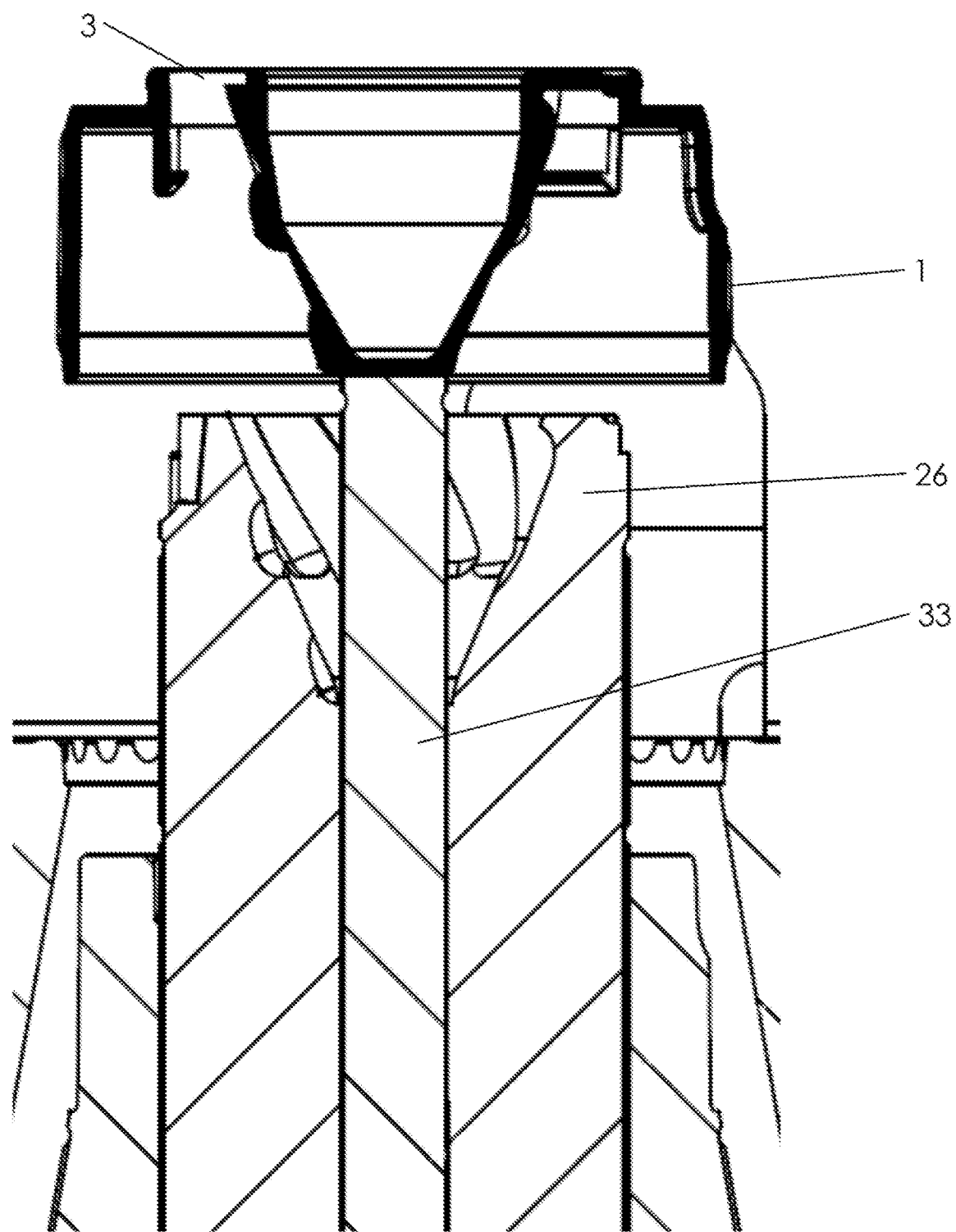

FIGS. 8-10 show the manufacture of the inventive upper part 1 using an injection moulding tool 24. The injection moulding tool 24 shown has a first tool part 25, a second tool part 26, together with further tool parts 27. A nozzle 28 for the introduction of a curable plastic material is arranged on the first tool part 25. In FIG. 8, the injection moulding tool 24 is located in a production position. In the production position, a cavity 29 is formed between the first tool part 25 and the second tool part 26, which cavity determines the shape of the upper part 1 to be created. FIG. 8 shows a cross-sectional view of a moulding element 30 on the first tool part 25, which is inserted into a recess 31 of the second tool part 26 so as to create the snap element 9. Between the tool surfaces of the moulding element 30 and the recess 31, a sub-region 59 of the cavity 29 is formed, which determines the shape of the snap element 9. The number of moulding elements 30 and recesses 31 corresponds to the number of snap elements 9 on the upper part 1 to be created. On a lower face of the moulding element 30, which faces away from the rest of the first tool element 25, there is an indentation 32, for purposes of creating the snap lug 11 of the snap element 9. The snap lug can, however, also be produced by a corresponding release in the sub-region 59. In FIG. 8, no plastic material has yet been filled into the cavity 29.

FIG. 8a shows a section of FIG. 8 relating to the sub-region 59 and the moulding element 30 in detail.

After the plastic material has cured, the first tool part 25 is separated from the second tool part 26. In accordance with the invention, the moulding element 30 is pulled out of the recess 31 through the opening 3 of the upper part 1 that has been created, whereby the snap element 9 of the created upper part 1 can consequently be removed, or ejected, from the injection moulding tool 24 without deformation, since the moulding element 30 no longer blocks the removal of the upper part 1, as is the case in the prior art. The separation of the first tool part 25 from the second tool part 26 is illustrated in FIG. 8a by the arrow.

The ejection of the upper part 1 is shown in FIGS. 9 and 10. In the form of embodiment shown, the other tool parts 27 are firstly removed. In general terms, other tool parts 27 are not absolutely necessary. An ejector pin 33 is then extended from the second tool part 26, which pin pushes the upper part 1 upwards, such that the latter can be removed more easily.

The invention claimed is:

1. An upper part for a spice mill which is at least partly made of a plastic material, comprising:
   an upper cover surface, with at least two openings, arranged along an imaginary circle,
   a circumferential lateral surface,
   a milling piece or a mounting for the milling piece,
   snaps that, in plan view, are aligned with respective ones of the at least two openings, the snaps being configured to rotatably connect the upper part to a lower part, and
   each of the snaps comprises a web projecting from a respective one of the at least two openings in a direction of the milling piece or the mounting, the web having a snap lug facing inwards towards an axis of rotation.

2. The upper part according to claim 1, wherein, at least three openings are provided, which are arranged along the imaginary circle.

3. The upper part according to claim 1, wherein, each snap is arranged in alignment with a respective one of the at least two openings, and the snaps are spaced apart from each other.

4. The upper part according to claim 1, wherein, in plan view, each one of the at least two openings and each one of the snaps are in the shape of a circular arc.

5. The upper part according to claim 1, wherein, an upper snap surface of the snap lug is arranged in an angle α of 90° or less to an inner surface of the web.

6. The upper part according to claim 5, wherein, the upper snap surface of the snap lug is arranged in an angle α of between 75° and 90° to an inner surface of the web.

7. A spice mill, comprising:
   the upper part according to claim 1,
   a lower part with a snap projection, and
   the lower part being rotatably connected to the upper part by way of a snap connection between the snaps and the snap projection.

8. The spice mill according to claim 7, wherein, the lower part has a lateral surface, which is on an inner surface of which milling projections are provided, and on an outer surface of which the snap projection is provided.

9. The spice mill according to claim 8, wherein, the lateral surface is cylindrical or conical.

10. The spice mill according to claim 8, wherein, the lower part has a seating projection adjacent to a lower free end of the lateral surface.

11. The spice mill according to claim 7, wherein, the snap projection is circumferential.

12. A method for manufacturing the upper part according to claim 1, comprising:
   providing a multi-part injection moulding tool with a first tool part and a second tool part, wherein a cavity is formed between the first tool part and the second tool part, which corresponds essentially to the upper part,
   wherein, for forming one of the snaps, a moulding element of the first tool part is inserted into a recess of the second tool part, and said snap is formed between tool surfaces of the moulding element of the first tool part and the recess of the second tool part,
   introducing a curable plastic material by way of a nozzle into the cavity,
   separating the first and the second tool parts, wherein the moulding element is removed from the recess through at least one of openings of the upper part,
   ejecting the upper part.

13. The method according to claim 12, wherein,
the moulding element of the first tool part, and/or the recess of the second tool part, has an indentation for purposes of forming the snap lug.

14. A method for the manufacture of the spice mill comprising:
manufacturing the upper part in accordance with the method according to claim 12,
manufacturing the lower part with a snap projection,
connecting the upper part and the lower part by way of a snap connection between the snaps and the snap projection.

15. The method according to claim 14, wherein,
the snap projection is circumferential.

16. A injection moulding tool for the manufacture of an upper part according to claim 1, comprising:
at least a first tool part and a second tool part,
wherein in the production position of the injection moulding tool, a cavity is formed between the first and the second tool part, which cavity corresponds essentially to the upper part,
wherein, for forming one of the snaps, a moulding element of the first tool part is inserted into a recess of the second tool part, and a sub-region of the cavity, in which said snap is formed, is bounded by tool surfaces of the moulding element of the first tool part and the recess of the second tool part.

17. The injection moulding tool according to claim 16, wherein,
the moulding element of the first tool part, and/or the recess of the second tool part, has an indentation for purposes of forming the snap lug.

18. The upper according to claim 1, wherein,
an upper snap surface of the snap lug is arranged in an angle $\alpha$ of between 75° and 90° to an inner surface of the web.

19. The upper part according to claim 1, wherein,
the at least two openings are through-openings for ground spices.

20. The upper part according to claim 1, wherein,
the snaps are elastically deformable.

* * * * *